US009772658B1

(12) United States Patent
Hsu

(10) Patent No.: US 9,772,658 B1
(45) Date of Patent: Sep. 26, 2017

(54) CASE FOR PROTECTING BATTERY AND ELECTRONIC DEVICE HAVING THE SAME

(71) Applicant: GETAC TECHNOLOGY CORPORATION, Hsinchu County (TW)

(72) Inventor: Wan-Lin Hsu, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 15/192,587

(22) Filed: Jun. 24, 2016

(51) Int. Cl.

| | | |
|---|---|---|
| *B29L 31/00* | (2006.01) |
| *G06F 1/16* | (2006.01) |
| *H01M 2/02* | (2006.01) |
| *H01M 2/08* | (2006.01) |
| *B29C 45/12* | (2006.01) |
| *B29C 45/16* | (2006.01) |
| *B29K 21/00* | (2006.01) |
| *B29K 25/00* | (2006.01) |

(52) U.S. Cl.
CPC ............ *G06F 1/1656* (2013.01); *B29C 45/12* (2013.01); *B29C 45/1615* (2013.01); *G06F 1/1635* (2013.01); *H01M 2/0202* (2013.01); *H01M 2/08* (2013.01); *B29K 2021/00* (2013.01); *B29K 2025/06* (2013.01); *B29L 2031/7146* (2013.01)

(58) Field of Classification Search
None
See application file for complete search history.

(56) References Cited

U.S. PATENT DOCUMENTS

| | | | | |
|---|---|---|---|---|
| 6,361,049 B1* | 3/2002 | Joco | ........................ | F16J 15/062 277/312 |
| 7,841,774 B2* | 11/2010 | Thompson | .............. | F16C 19/30 384/489 |
| 9,269,935 B2* | 2/2016 | Bandis | ................ | H01M 2/1094 |
| 2003/0007322 A1* | 1/2003 | Amemiya | ............. | G06F 1/1616 361/679.27 |
| 2006/0172184 A1* | 8/2006 | Hasuda | .................... | H01M 2/08 429/99 |
| 2006/0257729 A1* | 11/2006 | Lee | ......................... | H01M 2/04 429/174 |
| 2011/0075381 A1* | 3/2011 | Chang | ................ | H01M 2/1066 361/747 |
| 2011/0211300 A1* | 9/2011 | Mori | ..................... | G06F 1/1656 361/679.01 |

(Continued)

*Primary Examiner* — Xanthia C Cunningham

(57) ABSTRACT

A case for protecting a battery and an electronic device having the same are provided. The case includes a main body, a circumferential wall and a waterproof element. The main body includes a first side surface. The circumferential wall connects with the first side surface, extending along a first direction away from the first side surface, and includes a circumferential groove. The circumferential groove is around the circumferential wall and concavely disposed on an outer wall surface of the circumferential wall. The waterproof element includes a circumferential basal portion disposed in the circumferential groove and a circumferential raised portion disposed on an outer surface of the circumferential basal portion and corresponding in position to the circumferential groove. The circumferential raised portion includes a first segment and a second segment opposite to the first segment and farther from the first side surface than the first segment.

17 Claims, 10 Drawing Sheets

(56) References Cited

U.S. PATENT DOCUMENTS

| | | | |
|---|---|---|---|
| 2012/0009454 A1* | 1/2012 | Hirano | G07C 9/00944 |
| | | | 429/100 |
| 2012/0114998 A1* | 5/2012 | Hwang | H01M 2/1055 |
| | | | 429/99 |
| 2012/0150248 A1* | 6/2012 | Chi | A61N 1/3975 |
| | | | 607/5 |
| 2013/0337292 A1* | 12/2013 | Peterson | H01M 10/425 |
| | | | 429/7 |
| 2014/0211921 A1* | 7/2014 | Bandis | H01M 2/08 |
| | | | 378/91 |
| 2015/0104684 A1* | 4/2015 | Kim | H01M 2/1022 |
| | | | 429/94 |
| 2016/0113136 A1* | 4/2016 | Shin | G06F 1/1626 |
| | | | 361/679.01 |
| 2016/0190529 A1* | 6/2016 | Du | H01M 2/1094 |
| | | | 429/100 |
| 2016/0190530 A1* | 6/2016 | Du | H01M 2/1094 |
| | | | 429/185 |
| 2017/0084891 A1* | 3/2017 | Lu | H01M 2/1094 |
| 2017/0125751 A1* | 5/2017 | Lee | H01M 2/06 |

* cited by examiner

CASE FOR PROTECTING BATTERY AND ELECTRONIC DEVICE HAVING THE SAME

BACKGROUND OF THE INVENTION

Field of the Invention

The present invention relates to cases and, more particularly, to a case for protecting a battery and an electronic device having the same.

Description of the Prior Art

Users usually carry portable electronic devices, such as tablets and smartphones, and use them in a wide variety of circumstances. Therefore, portable electronic devices are more likely than stationary or family electronic devices, such as desktop computers, to malfunction because of liquid intrusion, for example, when in use outdoors on a rainy day or while frolicking in water. To cope with the aforesaid problems, an increasingly large number of portable electronic devices are waterproof.

Portable electronic devices are usually powered by batteries. The batteries of portable electronic devices generally fall into two categories: built-in batteries and removable batteries. As the name suggests, built-in batteries are made so as to be an integral part of the portable electronic devices, and thus built-in batteries require less electrical connection structures susceptible to liquid intrusion, thereby rendering waterproofing design simple. However, built-in batteries are irreplaceable to the detriment of ease of use. By contrast, removable batteries are exposed from the bodies of portable electronic devices. In general, a battery chamber is disposed on the back of a portable electronic device and adapted to hold a removable battery. The battery chamber has therein a jack, whereas the removable battery has a plug which can be inserted into the jack of the battery chamber. The removable battery can be electrically connected to an electronic assembly disposed in the portable electronic device. Removable batteries are usually replaceable and thus convenient to use. However, the plugs of the removable batteries and the jacks of the battery chambers of portable electronic devices are electrical connection structures susceptible to liquid intrusion. Therefore, the aforesaid portable electronic devices will not acquire a more advanced level of waterproofing capability, unless the plugs and jacks come with an additional waterproof structure.

SUMMARY OF THE INVENTION

Portable electronic devices powered by removable batteries and characterized by an advanced level of waterproofing capability will be feasible only if their plugs and jacks come with an additional waterproof structure; hence, these portable electronic devices require a manufacturing process which is not only intricate but also incurs high labor or material costs. To overcome the aforesaid drawbacks of the prior art, the present invention provides a case for protecting a battery and an electronic device having the same.

In an embodiment of the present invention, a case for protecting a battery comprises a main body, a circumferential wall and a waterproof element. The main body comprises a first side surface. The circumferential wall connects with the first side surface and extends in a first direction away from the first side surface. The circumferential wall includes a circumferential groove. The circumferential groove is around the circumferential wall and is concavely disposed on an outer wall surface of the circumferential wall. The waterproof element includes a circumferential basal portion and a circumferential raised portion. The circumferential basal portion is disposed in the circumferential groove. The circumferential raised portion is disposed on an outer surface of the circumferential basal portion and corresponds in position to the circumferential groove. The circumferential raised portion includes a first segment and a second segment opposing the first segment, wherein the first segment is closer to the first side surface than the second segment.

In an embodiment of the present invention, the circumferential raised portion further comprises two opposing third segments each having an end connecting with the first segment and extending in a second direction and another end connecting with the second segment, with an angle being formed between the first direction and the second direction and being larger than 0 degree but smaller than 90 degrees.

The first segment and the second segment are essentially parallel, and the third segments are each arcuate. The first segment is of the same route length as the second segment but of a larger route length than the third segments.

In an embodiment of the present invention, the first segment comprises a first steeply-sloped side and a first gently-sloped side opposing the first steeply-sloped side, with the first steeply-sloped side being closer to the first side surface than the first gently-sloped side, wherein the second segment comprises a second steeply-sloped side and a second gently-sloped side opposing the second steeply-sloped side, with the second gently-sloped side being closer to the first side surface than the second steeply-sloped side.

In an embodiment of the present invention, the circumferential basal portion comprises a first segment and a second segment opposing the first segment, allowing the first segment of the circumferential basal portion to be closer to the first side surface than the second segment of the circumferential basal portion, allowing the first segment of the circumferential raised portion to be disposed at the first segment of the circumferential basal portion, and allowing the second segment of the circumferential raised portion to be disposed at the second segment of the circumferential basal portion.

In an embodiment of the present invention, the first segment of the circumferential basal portion is of a first width along the first direction, and the second segment of the circumferential basal portion is of a second width along the first direction, with the first width being larger than the second width.

In an embodiment of the present invention, the waterproof element is made of a material of greater resilience than the circumferential wall.

In an embodiment of the present invention, the circumferential wall and the waterproof element are double injection elements, and the waterproof element is formed on the circumferential wall by a double injection molding process.

In an embodiment of the present invention, the electronic device comprises a device body and a battery module. The device body includes an electronic assembly and a casing, with the electronic assembly being disposed in the casing. The casing is defined with a battery chamber. The battery chamber includes a circumferentially closed wall. A portion of the wall is defined with a connecting port. The connecting port includes a first edge and a second edge. The first edge is closer to a bottom of the battery chamber than the second edge. The battery module is demountably disposed in the battery chamber. The battery module includes the case and the battery. The battery is disposed in the case. The battery includes a connecting unit. The circumferential wall encloses the connecting unit. The circumferential wall is penetratingly disposed in the connecting port, thereby allowing the connecting unit to be electrically connected to the electronic assembly. The waterproof element is disposed between the connecting port and the circumferential wall. The first segment of the circumferential raised portion abuts against the first edge of the connecting port, and the second segment of the circumferential raised portion abuts against the second edge of the connecting port.

In an embodiment of the present invention, the outer surface of the circumferential basal portion is flush with the outer wall surface of the circumferential wall.

In conclusion, a case for protecting a battery is provided in an embodiment of the present invention and characterized in that a waterproof element and the case are simultaneously molded to thereby not only simplify a manufacturing process but also cut labor and material costs. An electronic device is further provided in an embodiment of the present invention and characterized in that, due to the waterproof element, not only can a battery module of the electronic device be easily mounted and demounted, but a waterproofing effect is also achieved as soon as the battery module is mounted on the electronic device.

Fine structures and advantages of the present invention are described below with reference to preferred embodiments of the present invention to enable persons skilled in the art to gain insight into the technical features of the present invention and implement the present invention accordingly. Persons skilled in the art can easily understand the objectives and advantages of the present invention by making reference to the disclosure contained in the specification, the claims, and the drawings.

DETAILED DESCRIPTION OF THE EMBODIMENTS

Figure 1:
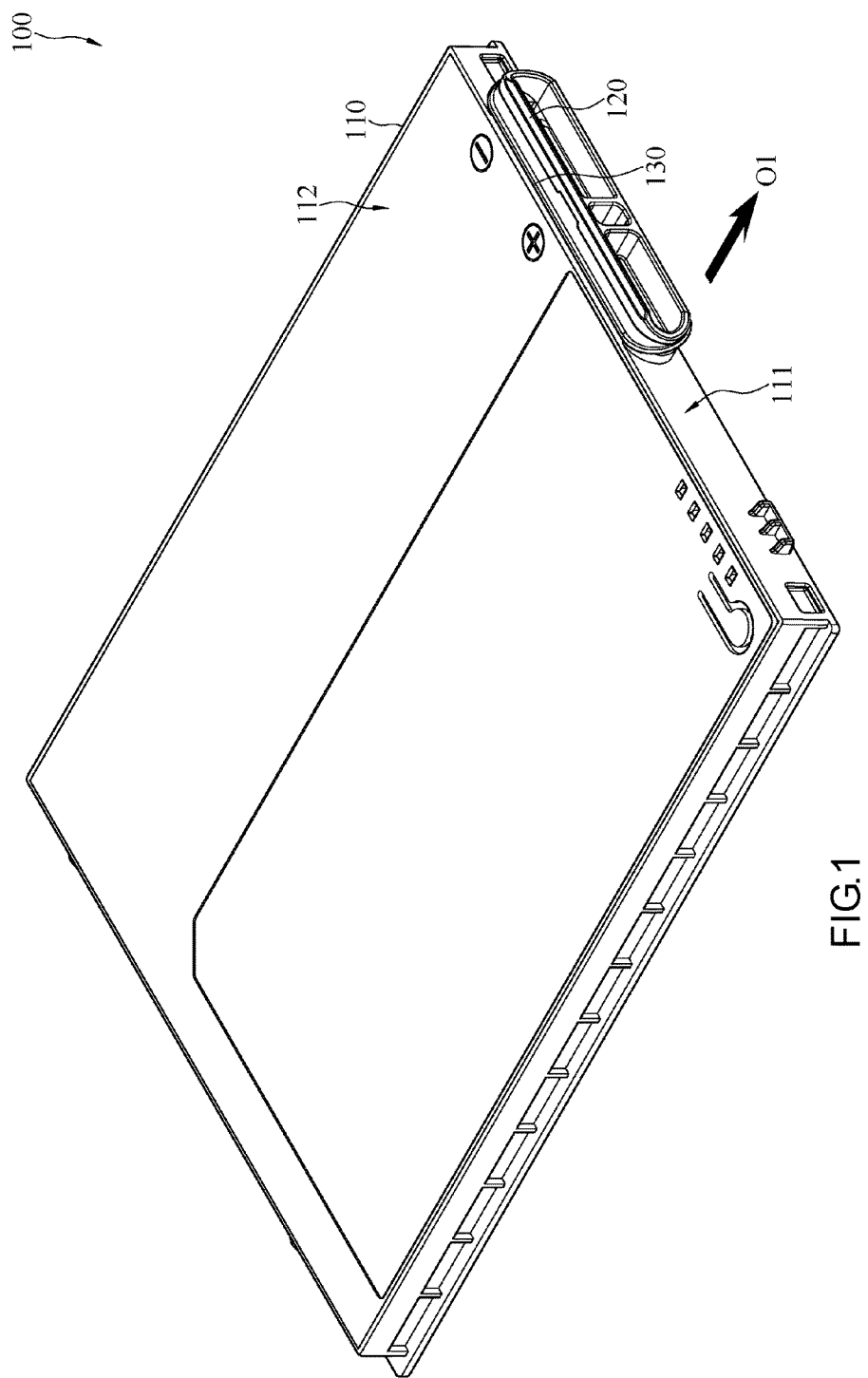
FIG. 1 is a schematic view of a case for protecting a battery according to an embodiment of the present invention.

Referring to FIG. 1, there is shown a schematic view of a case 100 for protecting a battery according to an embodiment of the present invention. In this embodiment, the case 100 has therein a battery (not shown). The case 100 comprises a main body 110, a circumferential wall 120 and a waterproof element 130. In this embodiment, the main body 110 is a hexahedron, but the present invention is not limited thereto. The main body 110 has a first side surface 111 and a second side surface 112. The first side surface 111 and the second side surface 112 not only adjoin each other but are also perpendicular to each other. The circumferential wall 120 connects with the first side surface 111 and extends in a first direction O1 away from the first side surface 111. The battery is disposed in the main body 110. The battery has an electrical connection terminal (not shown) which penetrates the first side surface 111 of the main body 110 and protrudes therefrom so as to be disposed within the circumferential wall 120, thereby allowing the circumferential wall 120 to enclose the electrical connection terminal.

Figure 2:
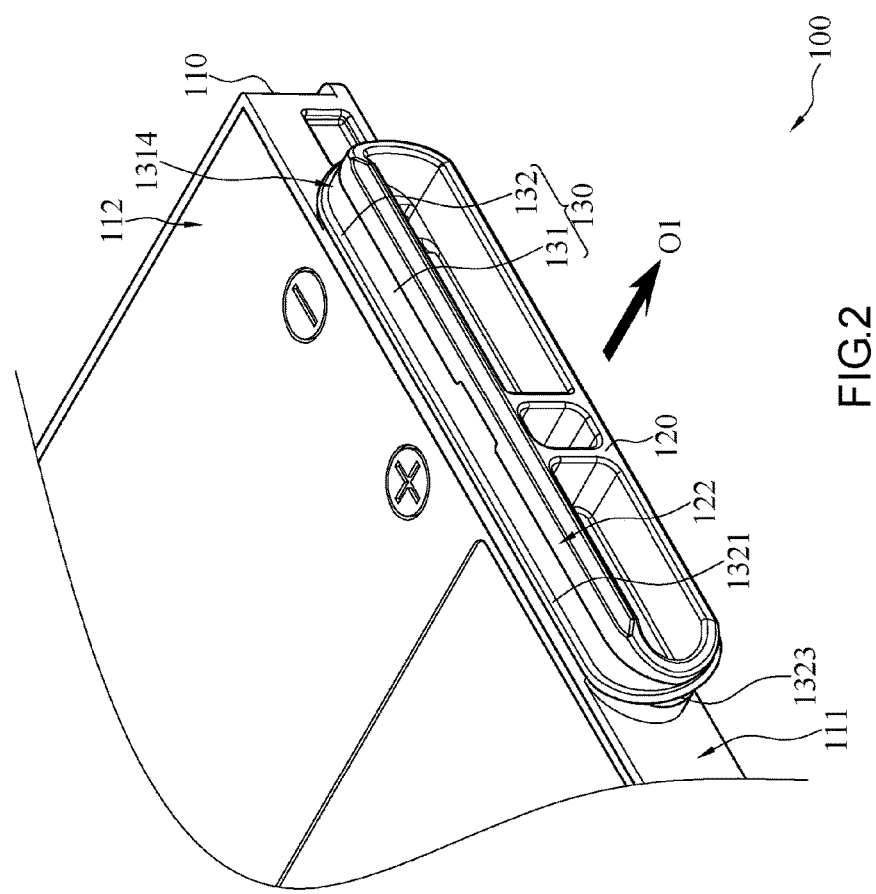
FIG. 2 is a partial enlarged schematic view of a circumferential wall and a waterproof element of FIG. 1.
Figure 3:
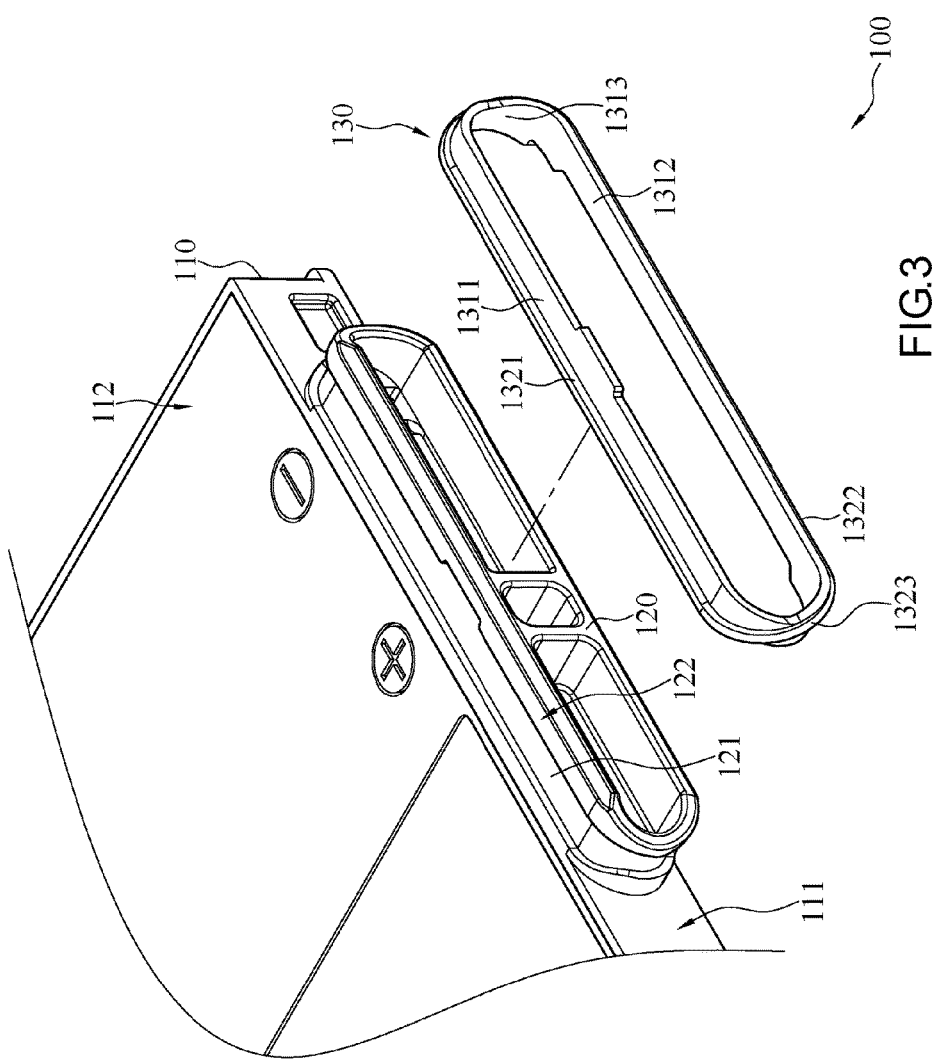
FIG. 3 is a schematic view of the waterproof element separated from the circumferential wall.

FIG. 2 and FIG. 3 are described below. FIG. 2 is a partial enlarged schematic view of the circumferential wall 120 and the waterproof element 130 of FIG. 1. FIG. 3 is a schematic view of the waterproof element 130 separated from the circumferential wall 120. The circumferential wall 120 is defined with an outer wall surface 122. The circumferential wall 120 comprises a circumferential groove 121. The circumferential groove 121 is concavely disposed on the outer wall surface 122 and is around the circumferential wall 120. The waterproof element 130 comprises a circumferential basal portion 131 and a circumferential raised portion 132. The circumferential basal portion 131 is disposed in the circumferential groove 121. The circumferential raised portion 132 is disposed on an outer surface 1314 of the circumferential basal portion 131 and corresponds in position to the circumferential groove 121. In this embodiment, the circumferential wall 120 and the waterproof element 130 are double injection elements. Therefore, the waterproof element 130 is formed on the circumferential wall 120 by a double injection molding process. For example, during the injection molding process, the raw materials which the main body 110 and the circumferential wall 120 are made of are introduced into a mold in the first stage so that the main body 110, the circumferential wall 120 and the circumferential groove 121 are molded during the first stage. Afterward, under the condition that the main body 110 and the circumferential wall 120 have not yet been released from their molds, the raw material which the waterproof element 130 is made of is introduced into its mold in the second stage, and the circumferential basal portion 131 is directly formed in the circumferential groove 121. After being released from their molds, the main body 110, the circumferential wall 120 and the waterproof element 130 get molded. In doing so, not only is the production process simplified, but the strength of the connection between the waterproof element 130 and the circumferential wall 120 is also enhanced. The waterproof element 130 is made of a material of greater resilience than the circumferential wall 120. Alternatively, the waterproof element 130 is made of a material of a smaller Young's modulus than the circumferential wall 120. For example, the waterproof element 130 is made of rubber, whereas the circumferential wall 120 is made of polystyrene, but the present invention is not limited thereto.

Figure 4:
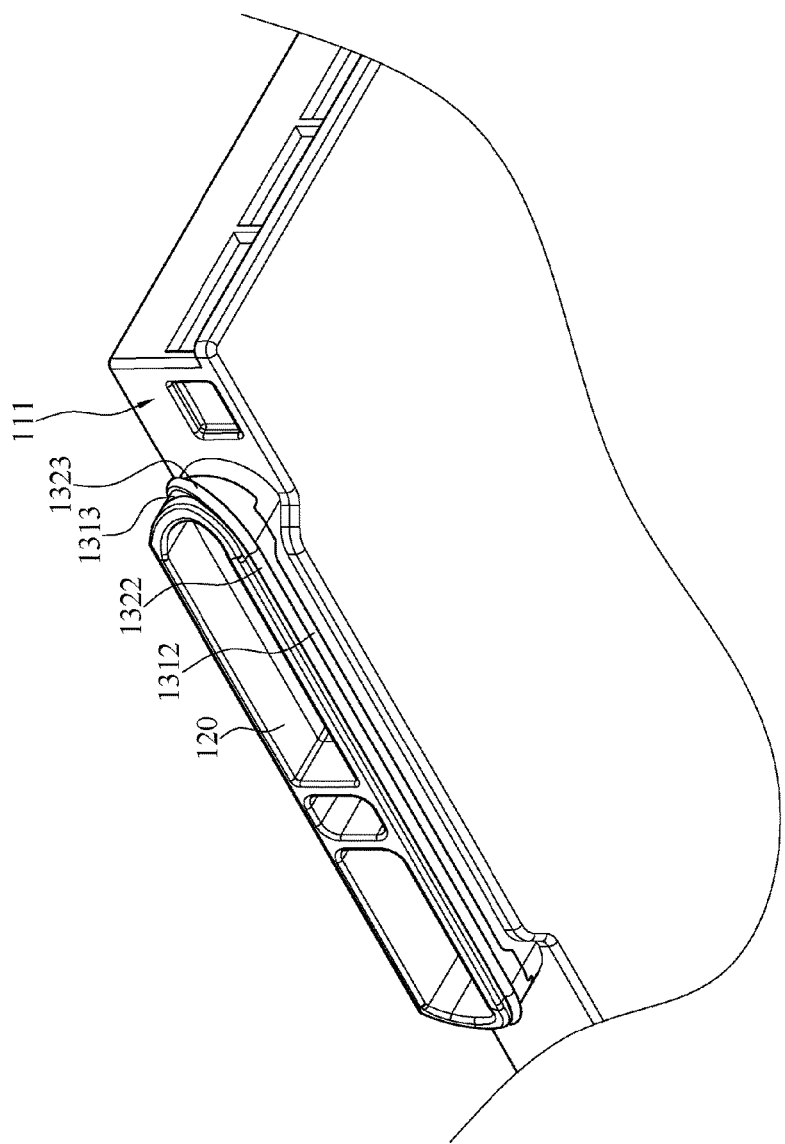
FIG. 4 is a schematic view of the waterproof element and the circumferential wall taken from another angle and previously shown in FIG. 2.

Referring to FIG. 2 through FIG. 4, FIG. 4 is a schematic view of the waterproof element 130 and the circumferential wall 120 taken from another angle and previously shown in FIG. 2. The circumferential basal portion 131 comprises a first segment 1311, a second segment 1312 and two third segments 1313. The first segment 1311 and the second segment 1312 of the circumferential basal portion 131 are disposed opposite to each other. The two third segments 1313 of the circumferential basal portion 131 are disposed opposite to each other. The third segments 1313 are disposed between the first segment 1311 and the second segment 1312. The first segment 1311, the second segment 1312 and the two third segments 1313 of the circumferential basal portion 131 together form a complete circumferential structure. The circumferential raised portion 132 comprises a first segment 1321, a second segment 1322 and two third segments 1323. The first segment 1321 and the second segment 1322 are disposed opposite to each other. The two third segments 1323 are disposed opposite to each other. The third segments 1323 are disposed between the first segment 1321 and the second segment 1322. The first segment 1321, the second segment 1322 and the two third segments 1323 of the circumferential raised portion 132 together form a complete circumferential structure. The first segment 1321 of the circumferential raised portion 132 is disposed on the first segment 1311 of the circumferential basal portion 131. The second segment 1322 of the circumferential raised portion 132 is disposed on the second segment 1312 of the circumferential basal portion 131. The two third segments 1323 of the circumferential raised portion 132 are disposed at the two third segments 1313 of the circumferential basal portion 131, respectively.

Figure 5:
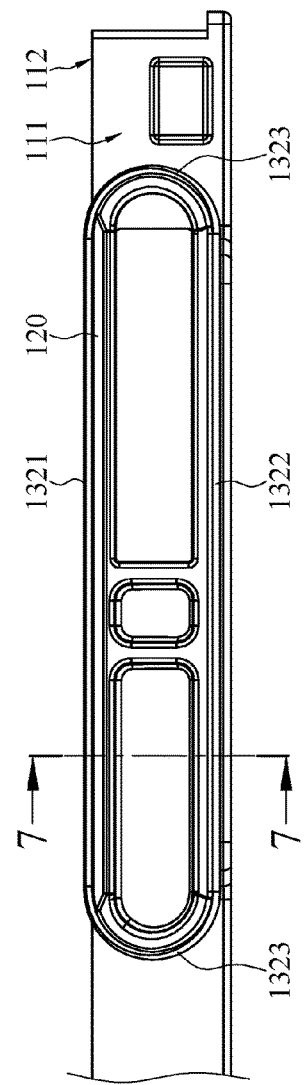
FIG. 5 is a front view of the waterproof element and the circumferential wall.
Figure 6:
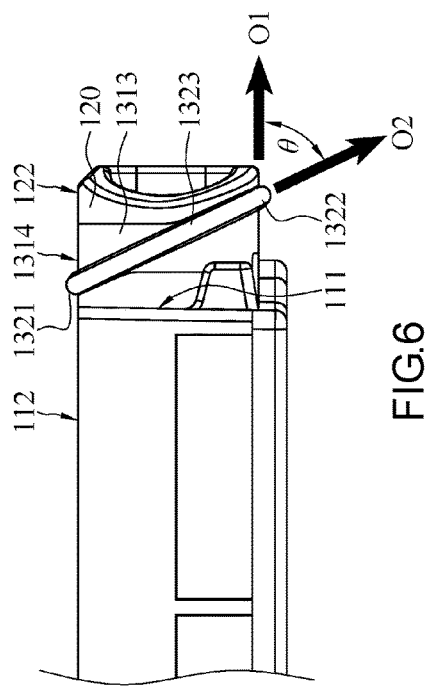
FIG. 6 is a lateral view of the waterproof element and the circumferential wall.
Figure 7:
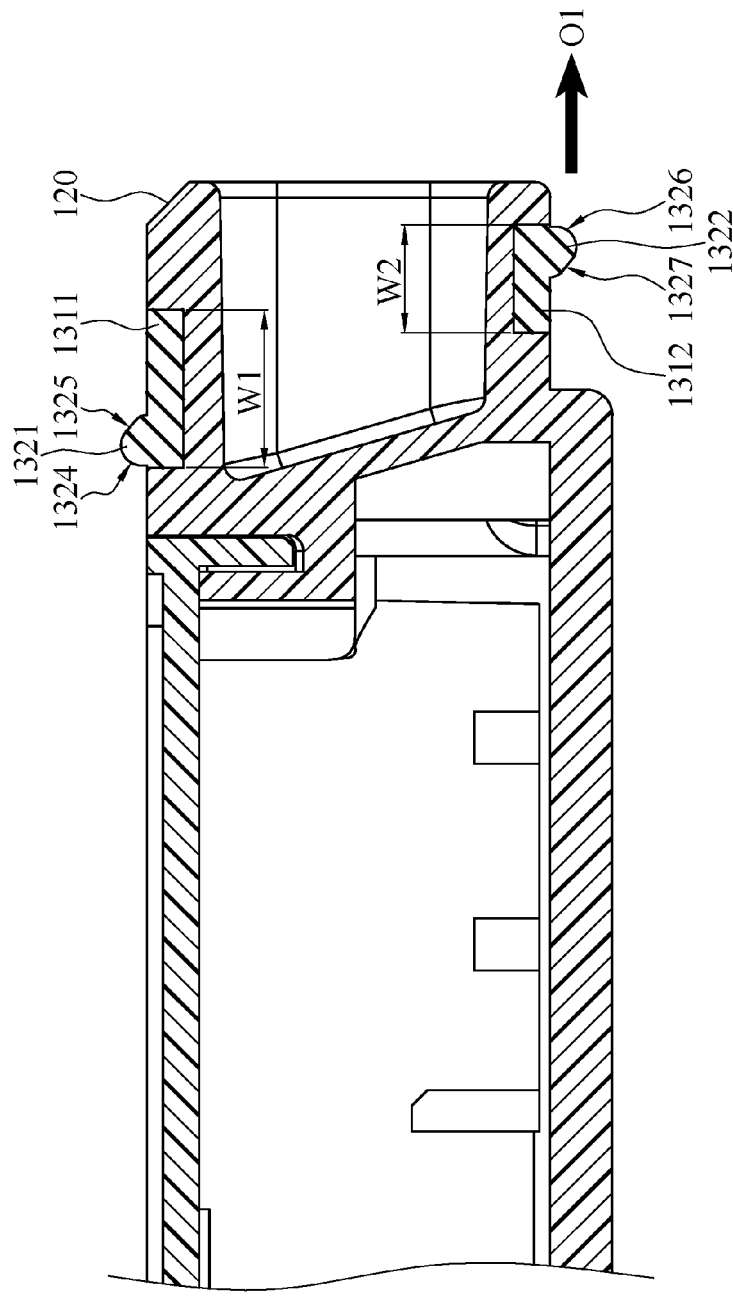
FIG. 7 is a cross-sectional view of the waterproof element and the circumferential wall taken along line 7-7 of FIG. 5.

FIG. 5 through FIG. 7 are described below. FIG. 5 is a front view of the waterproof element 130 and the circumferential wall 120. FIG. 6 is a lateral view of the waterproof element 130 and the circumferential wall 120. FIG. 7 is a cross-sectional view of the waterproof element 130 and the circumferential wall 120 taken along line 7-7 of FIG. 5. In this embodiment, as shown in FIG. 5, the first segment 1321 and the second segment 1322 of the circumferential raised portion 132 are essentially parallel, whereas the third segments 1323 of the circumferential raised portion 132 are each arcuate. With the circumferential wall 120 (shown in FIG. 5) being viewed from the front, the circumferential raised portion 132 is substantially oblong, but the present invention is not limited thereto. Referring to FIG. 6 and FIG. 7, the first segment 1321 of the circumferential raised portion 132 is closer to the first side surface 111 than the second segment 1322, whereas one end of each third segment 1323 connects with the first segment 1321 and extends in a second direction O2 (shown in FIG. 6) so that the other end of each third segment 1323 connects with the second segment 1322. An angle is formed between the first direction O1 and the second direction O2. The angle is larger than 0 degree but smaller than 90 degrees. With the circumferential wall 120 (shown in FIG. 6) being viewed laterally, the circumferential raised portion 132 tilts relative to the circumferential wall 120.

Referring to FIG. 2 through FIG. 5, regarding the circumferential raised portion 132, the route length of the first segment 1321 and the second segment 1322 is defined as the distance between the two third segments 1323, whereas the route length of the third segments 1323 is defined as the arc length between the first segment 1321 and the second segment 1322. In this embodiment, regarding the circumferential raised portion 132, the first segment 1321 is of the same route length as the second segment 1322 but of a larger route length than the third segments 1323. Referring to FIG. 6, the outer surface 1314 of the circumferential basal portion 131 is flush with the outer wall surface 122 of the circumferential wall 120.

Referring to FIG. 6 and FIG. 7, the first segment 1321 of the circumferential raised portion 132 comprises a first steeply-sloped side 1324 and a first gently-sloped side 1325 which are disposed opposite to each other, wherein the first steeply-sloped side 1324 is closer to the first side surface 111 than the first gently-sloped side 1325. The second segment 1322 of the circumferential raised portion 132 comprises a second steeply-sloped side 1326 and a second gently-sloped side 1327 which are disposed opposite to each other, wherein the second gently-sloped side 1327 is closer to the first side surface 111 than the second steeply-sloped side 1326. Both the first steeply-sloped side 1324 and the second steeply-sloped side 1326 have a steep inclined surface, i.e., a large gradient. Both the first gently-sloped side 1325 and the second gently-sloped side 1327 have a gentle inclined surface, i.e., a small gradient.

Regarding the circumferential basal portion 131, the first segment 1311 is of a first width W1 along the first direction O1, and the second segment 1312 is of a second width W2 along the first direction O1. The first width W1 is larger than the second width W2. The first segment 1321 of the circumferential raised portion 132 is disposed at one end of the first segment 1311 of the circumferential basal portion 131 and positioned proximate to the first side surface 111, whereas the second segment 1322 of the circumferential raised portion 132 is disposed at one end of the second segment 1312 of the circumferential basal portion 131 and positioned distal to the first side surface 111.

Figure 8:
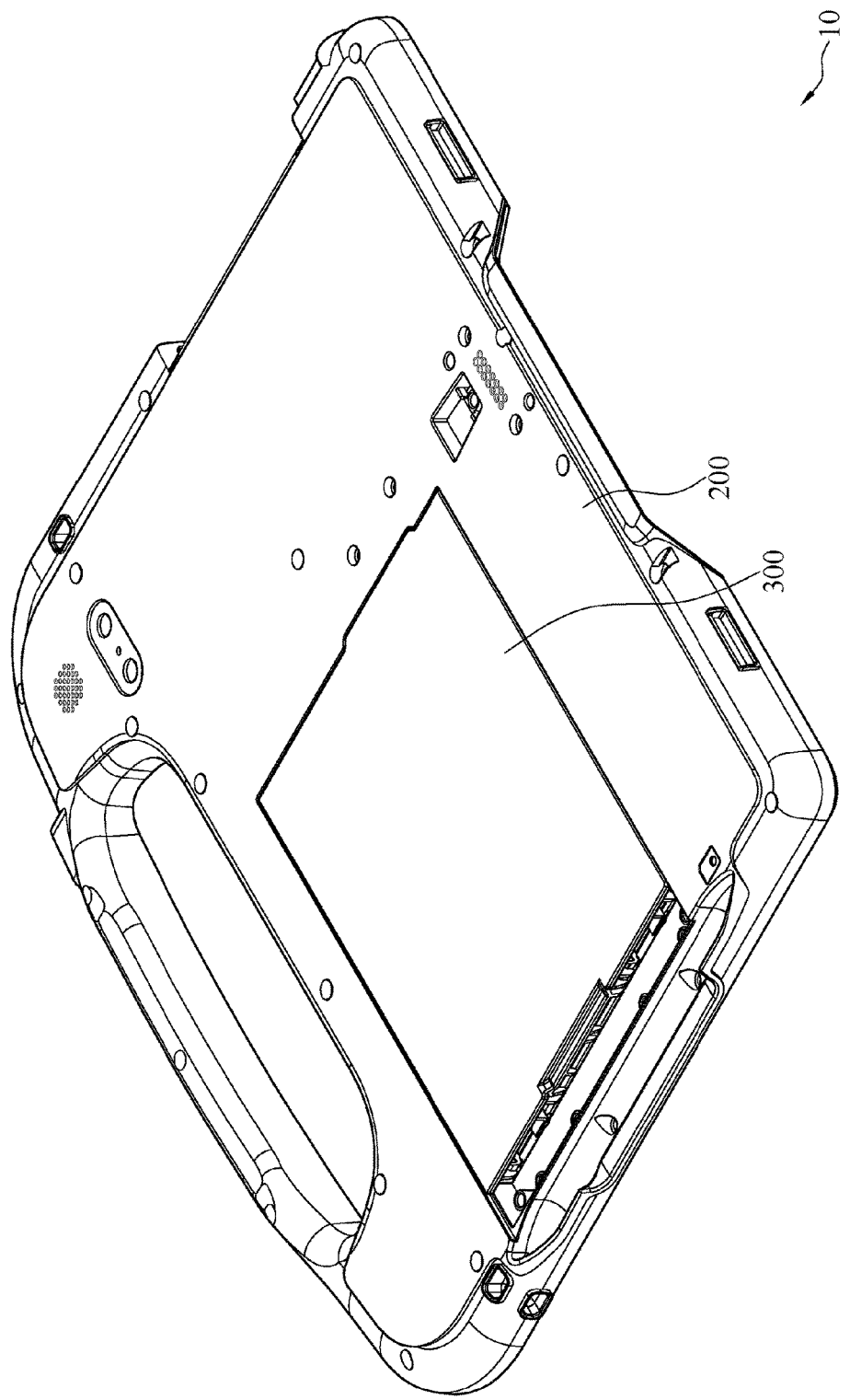
FIG. 8 is a schematic view of an electronic device according to an embodiment of the present invention.
Figure 9:
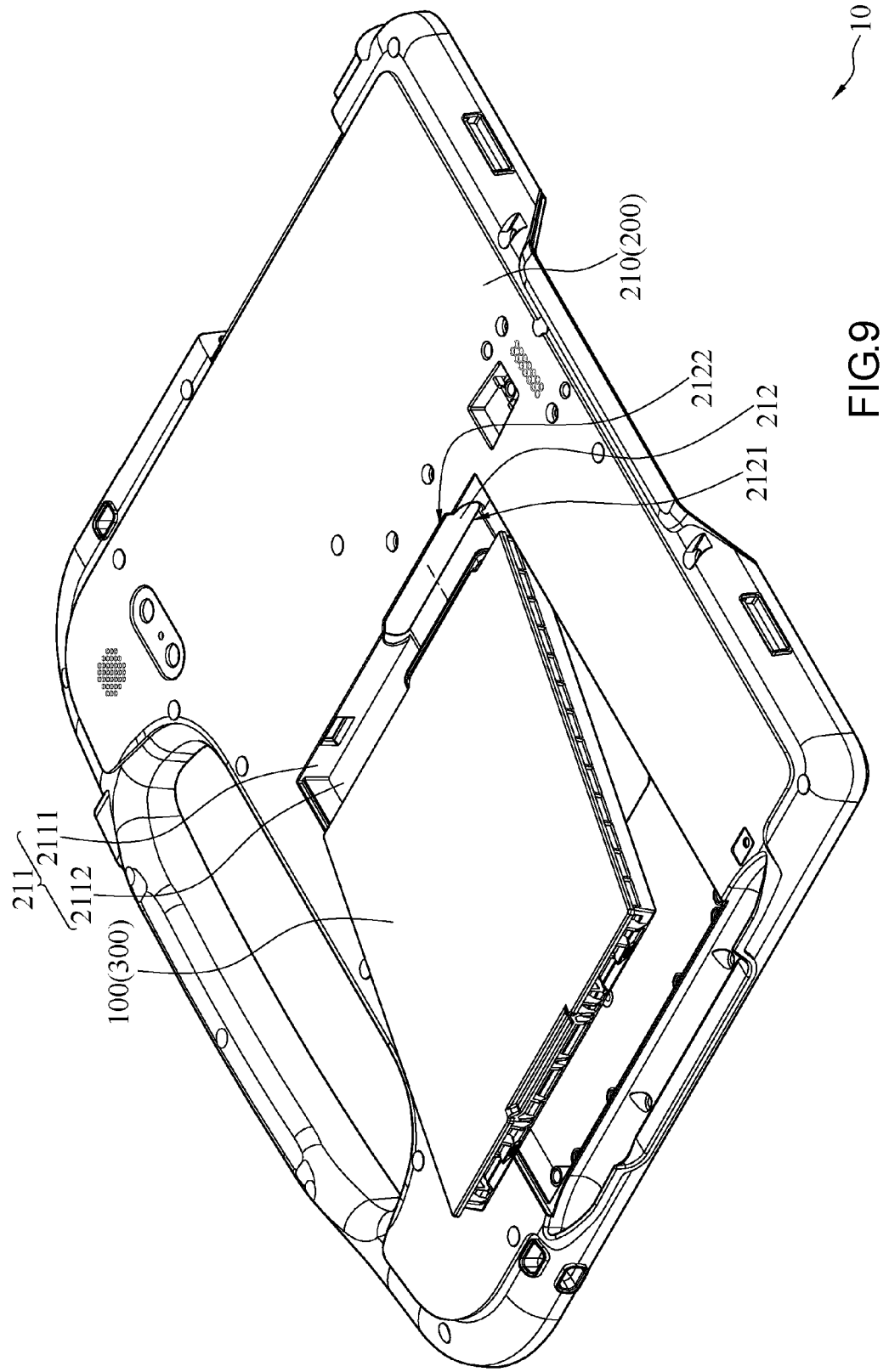
FIG. 9 is a schematic view of a battery module and a device body which are separated.

FIG. 8 and FIG. 9 are described below. FIG. 8 is a schematic view of an electronic device 10 according to an embodiment of the present invention. FIG. 9 is a schematic view of a battery module 300 and a device body 200 which are separated. In this embodiment, the electronic device 10 is a tablet, but the present invention is not limited thereto. The electronic device 10 comprises the device body 200 and the battery module 300. The device body 200 comprises an electronic assembly (not shown) and a casing 210. The electronic assembly is disposed within the internal space of the casing 210. Examples of the electronic assembly include a motherboard, chips and memory mounted on the motherboard, as well as a display module and a hard disk drive which are electrically connected to the motherboard. The battery module 300, which is removable, can be mounted on the device body 200 and contributes to the look of the electronic device 10 together with the device body 200. As soon as the battery module 300 is appropriately mounted on the device body 200, the battery module 300 gets electrically connected to the electronic assembly and thus gets ready to supply power to the electronic assembly.

Referring to FIG. 9, the casing 210 is defined with a battery chamber 211. The battery chamber 211 comprises a circumferentially closed wall 2111 and a bottom 2112. A portion of the wall 2111 is defined with a connecting port 212. The connecting port 212 enables the battery chamber 211 to be in communication with the casing 210. The connecting port 212 comprises a first edge 2121 and an opposing second edge 2122. The first edge 2121 is closer to the bottom 2112 of the battery chamber than the second edge 2122. The battery module 300 is demountably disposed in the battery chamber 211. The battery module 300 comprises the case 100 (shown in FIG. 1 through FIG. 7) and a battery (not shown). The battery is disposed in the case 100. Regarding the battery module 300 shown in FIG. 9, the case 100 tilts relative to the battery chamber 211 so that the battery module 300 can be easily mounted on the device body 200 or dismounted from the device body 200, as described below.

Figure 10:
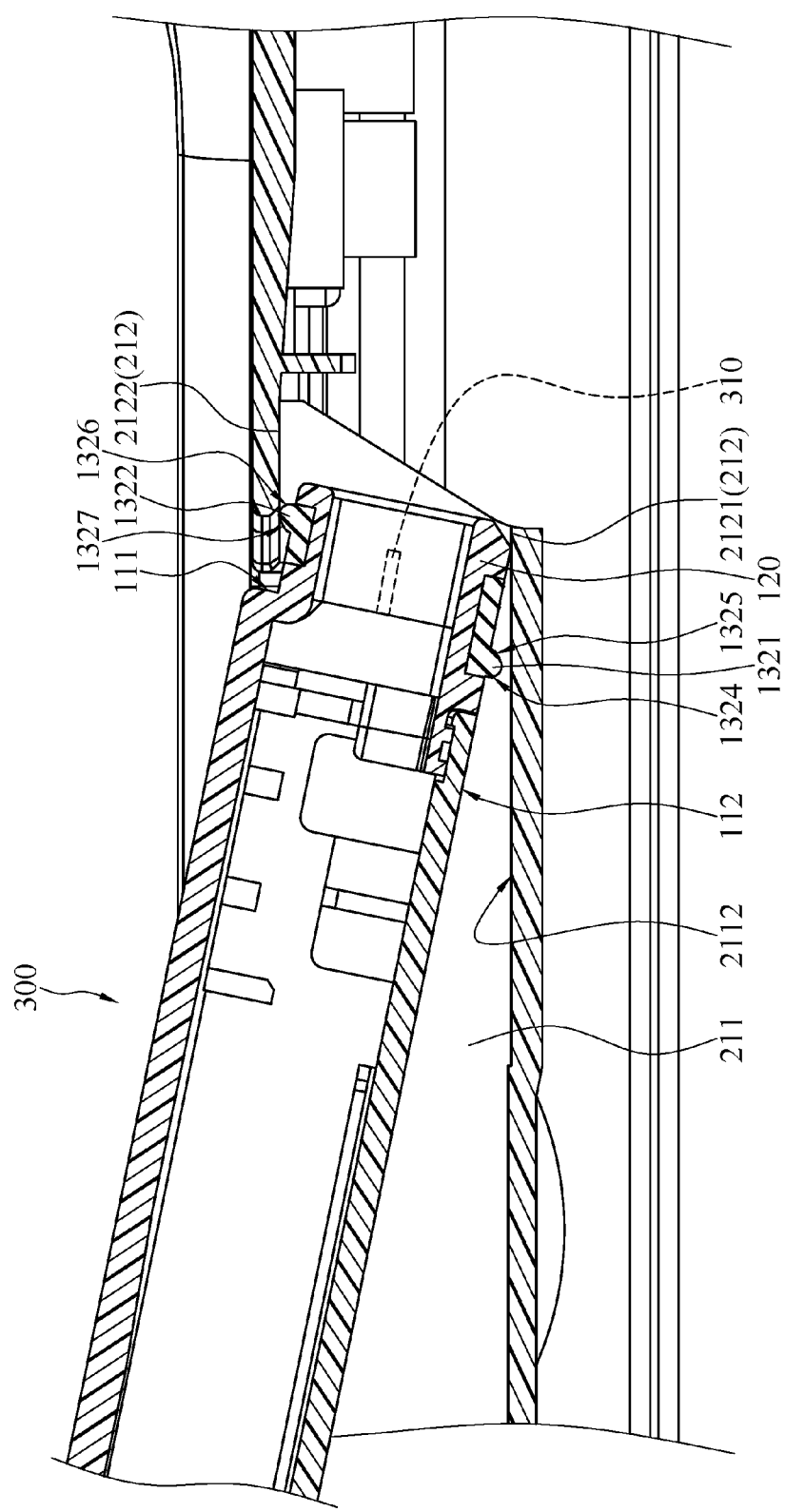
FIG. 10 is a cross-sectional view of how to mount the battery module on the device body, with the circumferential wall being obliquely inserted into a connecting port.
Figure 11:
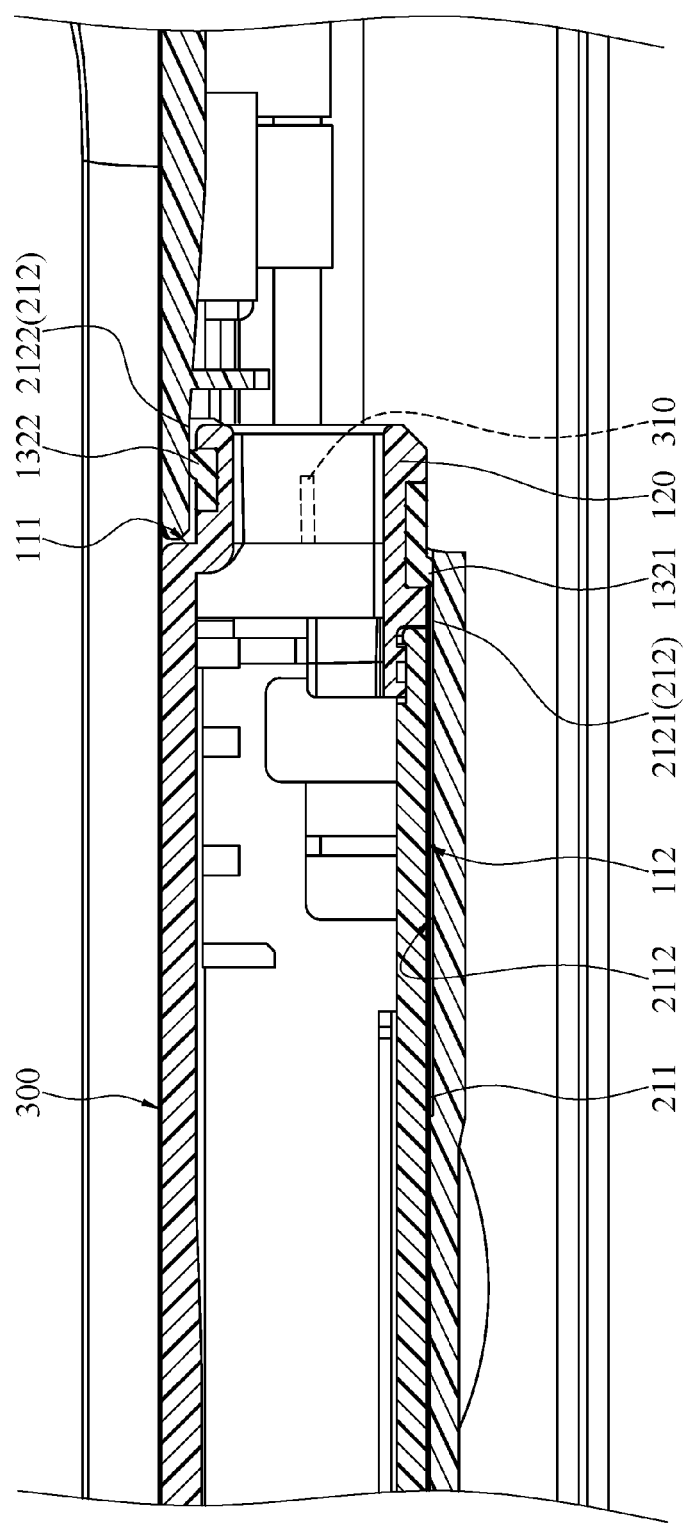
FIG. 11 is a cross-sectional view of the battery module mounted on the device body.

FIG. 10 and FIG. 11 are described below. FIG. 10 is a cross-sectional view of how to mount the battery module 300 on the device body 200, with the circumferential wall 120 being obliquely inserted into the connecting port 212. FIG. 11 is a cross-sectional view of the battery module 300 mounted on the device body 200. Compared with the case 100 shown in FIG. 1 through FIG. 7, the case 100 of the battery module 300 shown in FIG. 8 through FIG. 11 is upside down, thereby showing both the second side surface 112 of the case 100 and the first segment 1321 of the circumferential raised portion 132 at the bottom of the diagrams. The battery comprises a connecting unit 310. The connecting unit 310 penetrates the first side surface 111 and protrudes therefrom so as to be disposed within the circumferential wall 120, thereby allowing the circumferential wall 120 to enclose the connecting unit 310. Examples of the connecting unit 310 include a plurality of spaced-apart metal pins, and a plurality of metal plates arranged at intervals on a tongue.

Referring to FIG. 10, to mount the battery module 300 on the device body 200, a user tilts the battery module 300 relative to the battery chamber 211 so that the circumferential wall 120 is flush with the connecting port 212 and enters the connecting port 212 a little bit. At this point in time, an acute angle is formed between the second side surface 112 of the battery module 300 and the bottom 2112, thereby allowing the first segment 1321 of the circumferential raised portion 132 to approach the first edge 2121 of the connecting port 212, and the second segment 1322 of the circumferential raised portion 132 to approach the second edge 2122 of the connecting port 212. In this situation, since the second segment 1322 is farther from the first side surface 111 than the first segment 1321, the second segment 1322 goes deeper into the connecting port 212 than the first segment 1321. Then, the user rotates the battery module 300 (counterclockwise as shown in FIG. 10) and allows the circumferential wall 120 to keep entering the connecting port 212. The angle between the second side surface 112 of the battery module 300 and the bottom 2112 decreases gradually, that is, the inclination of the battery module 300 relative to the battery chamber 211 decreases gradually, while the circumferential wall 120 is entering the connecting port 212. Due to the gradual admission of the circumferential wall 120 into the connecting port 212 and the gradual decrease in the inclination of the battery module 300 relative to the battery chamber 211, the second segment 1322 of the circumferential raised portion 132 comes into contact with the second edge 2122 of the connecting port 212 inevitably. It is only when the angle between the second side surface 112 and the bottom 2112 decreases to a specific range, for example, less than 30 degrees, that the first segment 1321 of the circumferential raised portion 132 comes into contact with the first edge 2121 of the connecting port 212. At this point in time, the first segment 1321 of the circumferential raised portion 132 and the first edge 2121 of the connecting port 212 moves relative to each other and thus generates friction, because they are in contact with each other. After the first segment 1321 has come into contact with the first edge 2121, the circumferential wall 120 goes deeper into the connecting port 212 a little bit, and the battery module 300 rotates slightly, so as for the second side surface 112 to be flush with the bottom 2112 and for the first side surface 111 to be flush with the wall 2111, as shown in FIG. 11. At this point in time, the battery module 300 gets mounted on the device body 200 appropriately. The circumferential wall 120 is penetratingly disposed in the connecting port 212 appropriately. The connecting unit 310 is electrically connected to the electronic assembly.

Under the condition that the battery module 300 has been mounted on the device body 200 appropriately, the circumferential raised portion 132 is sandwiched between the circumferential wall 120 and the inner wall surface of the connecting port 212 to achieve a waterproofing effect. Specifically speaking, a waterproof structure is formed by allowing the first segment 1321 of the circumferential raised portion 132 to abut against the first edge 2121 of the connecting port 212, allowing the second segment 1322 to abut against the second edge 2122 of the connecting port 212, and allowing the third segments 1323 to abut against the remaining portions of the connecting port 212. Since the waterproof element 130 is made of a material which is highly resilient (compared with the materials which the circumferential wall 120 and the connecting port 212 are made of), the circumferential raised portion 132 deforms slightly when pressed against and thus fits more tightly to the inner wall surface of the connecting port 212, and thus the gap between the connecting port 212 and the circumferential wall 120 is filled, thereby further enhancing the waterproofing effect.

As mentioned before, in the course of mounting the battery module 300 on the device body 200, not only do the second segment 1322 of the circumferential raised portion 132 and the second edge 2122 of the connecting port 212 come into contact with each other and move very little relative to each other (because the second segment 1322 has moved deep into the connecting port 212 by the time when the second segment 1322 comes into contact with the second edge 2122), but the first segment 1321 and the first edge 2121 also come into contact with each other and move very little relative to each other (being closer to the first side surface 111, the first segment 1321 does not move deep into the connecting port 212). In general, with the battery module 300 being mounted on the device body 200, the smaller the friction between the circumferential raised portion 132 and the connecting port 212, the less resistance the user is confronted with when mounting the battery module 300 in place. Therefore, it is easier and more labor-saving for the user to mount the battery module 300 on the device body 200.

Referring to FIG. 10 and FIG. 11, in the course of mounting the battery module 300 on the device body 200, as soon as the first segment 1321 of the circumferential raised portion 132 and the first edge 2121 of the connecting port 212 come into contact with each other and move relative to each other, the first gently-sloped side 1325 comes into contact with the first edge 2121 first and moves relative to the first edge 2121. The small gradient of the first gently-sloped side 1325 is conducive to a reduction in the friction generated by the movement of the first segment 1321 and the first edge 2121 relative to each other, and thus the battery module 300 can be mounted in place smoothly.

To demount the battery module 300 from the device body 200, the user follows the aforesaid steps in reverse order, wherein, likewise, the second segment 1322 of the circumferential raised portion 132 and the second edge 2122 of the connecting port 212 come into contact with each other and move very little relative to each other, whereas the first segment 1321 and the first edge 2121 also come into contact with each other and move very little relative to each other. In general, there is little friction between the circumferential raised portion 132 and the connecting port 212 while the battery module 300 is being demounted from the device body 200, and thus the user is confronted with less resistance when demounting the battery module 300. Therefore, it is easier and more labor-saving for the user to demount the battery module 300 from the device body 200.

Referring to FIG. 10 and FIG. 11, in the course of demounting the battery module 300 from the device body 200, the clockwise rotation of the second side surface 112 of the battery module 300 relative to the bottom 2112 (in the rotation direction shown in FIG. 10 and FIG. 11) is accompanied by the clockwise rotation of the second segment 1322 of the circumferential raised portion 132 while the second segment 1322 of the circumferential raised portion 132 is abutting against the second edge 2122 of the connecting port 212; meanwhile, due to the small gradient of the second gently-sloped side 1327, the second segment 1322 is confronted with little resistance while rotating clockwise, and thus the battery module 300 can be demounted more smoothly.

Although the technical features of the present invention are disclosed above by preferred embodiments, the preferred embodiments are not restrictive of the present invention. Any persons skilled in the art can make some changes and modifications to the preferred embodiments without departing from the spirit of the present invention. Accordingly, the legal protection for the present invention should be defined by the appended claims.

What is claimed is:

1. A case for protecting a battery, comprising:
   a main body having a first side surface;
   a circumferential wall connected to the first side surface and extending along a first direction away from the first side surface, wherein the circumferential wall includes a circumferential groove, with the circumferential groove being around the circumferential wall and concavely disposed on an outer wall surface of the circumferential wall; and
   a waterproof element including a circumferential basal portion and a circumferential raised portion, with the circumferential basal portion being disposed in the circumferential groove, and the circumferential raised portion being disposed on an outer surface of the circumferential basal portion, corresponding in position to the circumferential groove, and including a first segment and a second segment opposing the first segment, wherein the first segment is closer to the first side surface than the second segment.

2. The case for protecting a battery according to claim 1, wherein the circumferential raised portion further comprises two opposing third segments each having an end connecting with the first segment and extending in a second direction and another end connecting with the second segment, with an angle being formed between the first direction and the second direction and being larger than 0 degree but smaller than 90 degrees.

3. The case for protecting a battery according to claim 2, wherein the first segment and the second segment are essentially parallel, and the third segments are each arcuate.

4. The case for protecting a battery according to claim 2, wherein the first segment is of a same route length as the second segment but of a larger route length than the third segment.

5. The case for protecting a battery according to claim 1, wherein the first segment comprises a first steeply-sloped side and a first gently-sloped side opposing the first steeply-sloped side, with the first steeply-sloped side being closer to the first side surface than the first gently-sloped side, wherein the second segment comprises a second steeply-sloped side and a second gently-sloped side opposing the second steeply-sloped side, with the second gently-sloped side being closer to the first side surface than the second steeply-sloped side.

6. The case for protecting a battery according to claim 1, wherein the circumferential basal portion comprises a first segment and a second segment opposing the first segment, allowing the first segment of the circumferential basal portion to be closer to the first side surface than the second segment of the circumferential basal portion, allowing the first segment of the circumferential raised portion to be disposed at the first segment of the circumferential basal portion, and allowing the second segment of the circumferential raised portion to be disposed at the second segment of the circumferential basal portion.

7. The case for protecting a battery according to claim 6, wherein the first segment of the circumferential basal portion is of a first width along the first direction, and the second segment of the circumferential basal portion is of a second width along the first direction, with the first width being larger than the second width.

8. The case for protecting a battery according to claim 1, wherein the waterproof element is made of a material of greater resilience than the circumferential wall.

9. The case for protecting a battery according to claim 1, wherein the circumferential wall and the waterproof element are double injection elements, and the waterproof element is formed on the circumferential wall by a double injection molding process.

10. An electronic device, comprising:
    a device body including an electronic assembly and a casing, with the electronic assembly being disposed in the casing, the casing being defined with a battery chamber, the battery chamber including a circumferentially closed wall, the wall having a portion thereof being defined with a connecting port, the connecting port including a first edge and a second edge, the first edge being closer to a bottom of the battery chamber than the second edge; and
    a battery module being demountably disposed in the battery chamber and including a case for protecting a battery and the battery as recited in claim 1, the battery being disposed in the case and including a connecting unit, the circumferential wall enclosing the connecting unit and being penetratingly disposed in the connecting port, thereby allowing the connecting unit to be electrically connected to the electronic assembly, with the waterproof element of claim 1 being disposed between the connecting port and the circumferential wall and including a circumferential basal portion and a circumferential raised portion, wherein the first segment of the circumferential raised portion abuts against the first edge of the connecting port, and the second segment of the circumferential raised portion abuts against the second edge of the connecting port.

11. The electronic device of claim 10, wherein the circumferential raised portion further comprises two opposing third segments each having an end connecting with the first segment and extending in a second direction and another end connecting with the second segment, with an angle being formed between the first direction and the second direction and being larger than 0 degree but smaller than 90 degrees.

12. The electronic device of claim 11, wherein the first segment and the second segment are essentially parallel, and the third segments are each arcuate.

13. The electronic device of claim 10, wherein the first segment comprises a first steeply-sloped side and a first gently-sloped side opposing the first steeply-sloped side, with the first steeply-sloped side being closer to the first side surface than the first gently-sloped side, wherein the second segment comprises a second steeply-sloped side and a second gently-sloped side opposing the second steeply-sloped side, with the second gently-sloped side being closer to the first side surface than the second steeply-sloped side.

14. The electronic device of claim 10, wherein the circumferential basal portion comprises a first segment and a second segment opposing the first segment, allowing the first segment of the circumferential basal portion to be closer to the first side surface than the second segment of the circumferential basal portion, allowing the first segment of the circumferential raised portion to be disposed at the first segment of the circumferential basal portion, and allowing the second segment of the circumferential raised portion to be disposed at the second segment of the circumferential basal portion.

15. The electronic device of claim 10, wherein the waterproof element is made of a material of greater resilience than the circumferential wall.

16. The electronic device of claim 10, wherein the circumferential wall and the waterproof element are double injection elements, and the waterproof element is formed on the circumferential wall by a double injection molding process.

17. The electronic device of claim 10, wherein an outer surface of the circumferential basal portion is flush with an outer wall surface of the circumferential wall.

* * * * *